May 20, 1941. W. E. OSHEI 2,242,920
DIRECTION INDICATOR
Filed Dec. 5, 1936
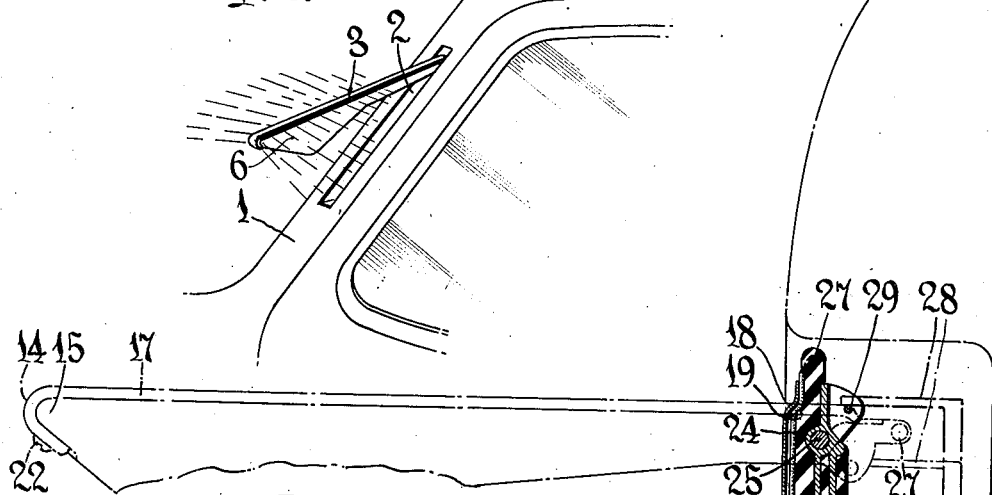
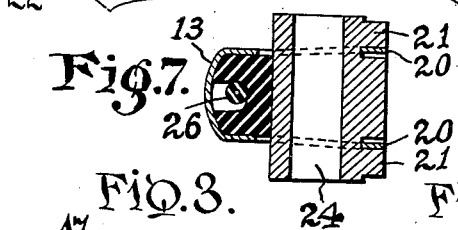
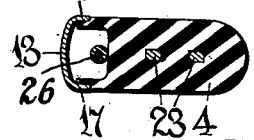
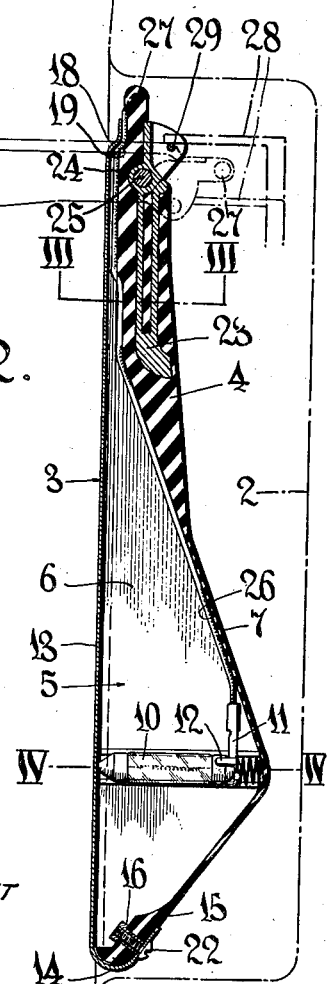
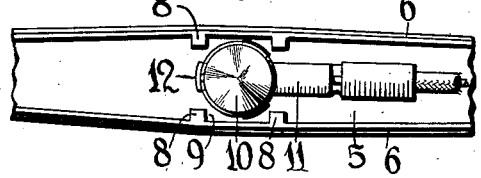
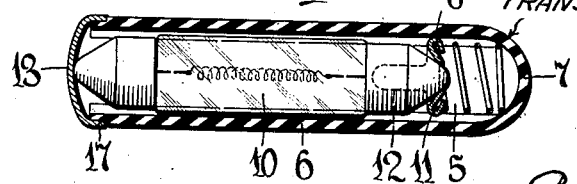
INVENTOR
William E. Oshei,
BY
Bean, Brooks, Buckley & Bean.
ATTORNEYS Patented May 20, 1941

2,242,920

UNITED STATES PATENT OFFICE 2,242,920

DIRECTION INDICATOR

William E. Oshei, Brentford, England

Application December 5, 1936, Serial No. 114,410

6 Claims. (Cl. 177—329)

This invention relates to a motor vehicle and primarily to a direction indicator so constructed and incorporated in the vehicle body construction as to constitute a part thereof.

The invention has for an object the construction of a semaphore type of signal in which the arm has its body portion molded from a transparent or transluscent material or plastic, such as Bakelite, into a unitary structure so as to simplify the manufacture thereof and enable its production in a form and of restricted dimensions sufficient to incorporate and house the same in the corner posts or other frame members of a motor vehicle body without materially weakening the same.

The invention further has for its object to simplify and strengthen the construction of the semaphore arm so as to make it practical and durable and at the same time add to its attractive appearance so as to readily arrest the attention of the traffic.

One physical embodiment of the present invention is depicted in the accompanying drawing wherein:

Fig. 1 is a fragmentary perspective view of the front end of a motor vehicle body illustrating a semaphore arm incorporated in the structure thereof, in accordance with the present invention;

Fig. 2 is a sectional view of the semaphore arm showing in phantom its operative relationship to the motor vehicle body;

Figs. 3 and 4 are transverse sectional views through the semaphore arm taken respectively about on lines III—III and IV—IV of Fig. 2;

Fig. 5 is a fragmentary plan view of the molded body of the semaphore arm with the closure plate removed;

Fig. 6 is a detailed view illustrating the interlock between the closure plate and the arm body; and Fig. 7 is a tranverse sectional view taken in a plane parallel to the plane of Fig. 3 and through the pivot bearing of the arm.

Referring more particularly to the drawing, numeral 1 designates one of the corner posts adjacent the windshield of a motor vehicle body, such post being provided with a longitudinally or upwardly extending slot forming a compartment 2 for the semaphore arm 3.

The semaphore arm is molded into a unitary or integral body formation having a shank part 4 and an outwardly disposed illuminating chamber 5 of broadened dimension so as to give prominence to the body when the arm is projected in a signal-giving positon. As illustrated in Fig. 4, the side walls 6 of the chamber 5 are integrally joined at their lower edges by a curved portion 7 and therewith form a U-shaped cross sectional appearance having the upper side of the chamber open for ready access to the interior thereof. The opposing side walls of the chamber are formed with internal ribs 8 to define a lamp pocket 9 in which a lamp 10 is introduced through the open side of the chamber 5. The sides of the pocket open into the chamber so that the latter will be easily flooded with light from the lamp. In the base of the lamp pocket is a resilient support 11 on which the lamp 10 rests, the support having lamp-gripping fingers 12 to unite the two for floating movement as a unit.

A cover 13 is provided for the illuminating chamber of the arm. This cover has its outer end 14 downturned to interlock with the tapered end portion 15 of the molded body of the arm. The longitudinal margins of the cover 13 are downturned to form flanges 17 for embracing the side walls 6 for better closing the chamber 5. The opposite end of the longitudinal cover member is formed with an offset 18 for engaging a shoulder 19 on the molded body portion of the arm, and are also formed with downwardly extending and body straddling keeper parts 20 designed to engage beneath shoulder 21 on the arm body. An anchor screw 22 may be used to secure the interlock in a positive manner. The end portion 15 is given increased wall thickness and suitable body reinforcement 16 for firmly holding the anchor screw.

In practice the cover 13 is slipped on to the body portion longitudinally thereof so as to initially engage the end 14 following which the parts 18 and 20 are engaged with the shoulders 19 and 21 of the arm body, and the entire assembly is positively secured operatively by the screw 22. As shown in Fig. 6 the portions of keeper parts 20 which engage shoulders 21 and the offset portion 18 which engages shoulder 19 are inclined, serving to cam the adjacent end of the cover 13 toward the moulded body as the cover is slipped longitudinally into place, and, since the inclination of offset portion 18 is greater than that of keeper parts 20, this cam action is accompanied by a slight spring action or snapping of the cover into place, permitted by its resilience, and serving to retain it interlocked against accidental displacement.

The shank portion 4 of the arm is provided with a longitudinally extending metallic reinforcement 23 which is preferably embedded therein and is formed with a transverse bearing 24 to receive the mounting shaft or pin 25, as depicted in Fig. 2. This pin as well as the shaft bearing 24 and the cover 13 are desirably metallic so as to provide a ground connection from the lamp into the electric circuit, the contact between the cover and bearing being effected by the keeper parts 20 engaging with the shoulders 21 which latter are formed on and as a part of the bearing 24. The lamp is depicted as being of the festoon type with an electric contact on each end so that one contact will engage the cover and the other contact engage the support 11. Consequently, by placing the cover on the arm the grounded electric connection from the lamp will be made. The resilient support 11 for the lamp provides a cushioned mounting for the same and is connected into the other side of the circuit by a wire 26. This wire is conveniently brought out beneath the offset 18 of the cover and connected to an electric contact 27 which is adapted to be brought into circuit closing engagement with a fixed contact (not shown) in the compartment 2 when the arm is projected to its signalling position.

Since the body portion of the arm is preferably molded of a light and transluscent material, the actuating mechanism for the arm, generally indicated at 28, is caused to engage a bearing pin 29 on the metallic insert 23, 24 so as to give longer life and greater durability to the signal.

By molding the arm body in a unitary chambered structure the latter may be formed thin or narrow and therefore the compartment 2 in the vehicle body member may likewise be of narrowed dimension to avoid materially weakening the same. The closure member 13 for the arm chamber may be stamped from sheet metal and may be of slightly greater dimension, since the greater portion thereof does not enter the compartment 2 to any great depth.

While the foregoing construction has been given in detail, it is obvious that the inventive principles herein involved may be applied to other physical embodiments without departing from the scope and spirit of the invention claimed.

What is claimed is:

1. A direction indicator for motor vehicles comprising an arm formed of molded light transmitting plastic and having a shank portion and a chamber portion, the opposed inner walls of the chamber being substantially parallel and at least one of said walls being provided with spaced ribs forming a lamp pocket.

2. A direction indicator for motor vehicles, comprising a hollow arm formed with light transmitting sides and provided with an inner shank portion and an outer chambered portion, the chamber being accessible through an opening in the edge of the arm, a closure for the open edge of the chamber, and a mounting member connected to the shank portion for mounting the arm and provided with a shaft bearing, said closure being provided with means for securing it to the arm, said means including a part interlocking with the shaft bearing for securing the adjacent end of the closure in position.

3. A direction indicator for motor vehicles, comprising an arm having an inner shank portion and an outer chamber portion, the chamber having light transmitting sides, said chamber being accessible through an opening in the edge of the arm, a mounting member connected to the shank portion for mounting the arm and provided with a shaft bearing, and a removable cover for the open edge of the chamber, said cover having a flat portion with marginal flanges for straddling said edge of the arm, said flanges being formed with depending keeper parts straddling the shank portion and slidable into interlocking relation with the shaft bearing to interlock the cover in position.

4. A direction indicator for motor vehicles, comprising an arm having an inner shank portion and an outer chamber portion, the chamber having light transmitting sides, said chamber being accessible through an opening in the edge of the arm, a mounting member connected to the shank portion for mounting the arm and provided with a shaft bearing, a removable cover for the open edge of the chamber, said cover having a flat portion with marginal flanges for straddling said edge of the arm, said flanges being formed with depending keeper parts straddling the shank portion and slidable into interlocking relation with the shaft bearing to interlock the cover in position, and means for securing the cover against sliding out of interlocking relationship with the shaft bearing.

5. A direction indicator for motor vehicles, comprising an arm having an inner shank portion and an outer chamber portion, the chamber having light transmitting sides, said chamber being accessible through an opening in the edge of the arm, a mounting member connected to the shank portion for mounting the arm and provided with a shaft bearing, and a removable cover for the open edge of the chamber, said cover having a flat portion with marginal flanges for straddling said edge of the arm, said flanges being formed with depending keeper parts straddling the shank portion and slidable into interlocking relation with the shaft bearing to interlock the cover in position, said flat portion having an offset part engageable over a shoulder on the shank portion during such sliding movement of the cover to secure the interlocking relation of the keeper parts with the mounting member.

6. A direction indicator for motor vehicles, comprising an arm having an inner shank portion and an outer chamber portion, the chamber having light transmitting sides, said chamber being accessible through an opening in the edge of the arm, a mounting member connected to the shank portion for mounting the arm and provided with a shaft bearing, a removable cover for the open edge of the chamber, said cover having a flat portion with marginal flanges for straddling said edge of arm, said flanges being formed with depending keeper parts straddling the shank portion and slidable into interlocking relation with the shaft bearing to interlock the cover in position, a lamp disposed within the chamber, and a circuit wire leading from the lamp along the shank portion beneath the cover for connection to the source of energy.

WILLIAM E. OSHEI.